United States Patent
Fu et al.

(10) Patent No.: US 7,856,034 B2
(45) Date of Patent: Dec. 21, 2010

(54) METHOD AND SYSTEM FOR GENERATING DIGITAL VIDEO BROADCAST (DVB) TRANSPORT STREAM FROM DIRECT SATELLITE SYSTEM (DSS) TRANSPORT STREAM

(75) Inventors: Jiang Fu, Irvine, CA (US); Sherman (Xuemin) Chen, San Diego, CA (US); Jason Demas, Irvine, CA (US); Isen Vincent Wang, Tustin, CA (US)

(73) Assignee: Broadcom Corp.

( * ) Notice: Subject to any disclaimer, the term of this patent is extended or adjusted under 35 U.S.C. 154(b) by 0 days.

(21) Appl. No.: 12/397,173

(22) Filed: Mar. 3, 2009

(65) Prior Publication Data

US 2009/0168691 A1 Jul. 2, 2009

Related U.S. Application Data

(63) Continuation of application No. 10/341,704, filed on Jan. 13, 2003, now Pat. No. 7,499,469.

(51) Int. Cl.
*H04J 3/22* (2006.01)
(52) U.S. Cl. ............... 370/466; 370/474; 725/67
(58) Field of Classification Search ......... 370/465–466, 370/470–476; 725/63, 67, 70–71, 105, 116
See application file for complete search history.

(56) References Cited

U.S. PATENT DOCUMENTS

| | | | |
|---|---|---|---|
| 5,517,250 A * | 5/1996 | Hoogenboom et al. . | 375/240.27 |
| 5,598,415 A * | 1/1997 | Nuber et al. ........... | 370/474 |
| 5,917,830 A | 6/1999 | Chen et al. | |
| 6,088,355 A | 7/2000 | Mills et al. | |
| 6,134,419 A | 10/2000 | Williams | |
| 6,181,706 B1 * | 1/2001 | Anderson et al. ....... | 370/412 |
| 6,263,396 B1 * | 7/2001 | Cottle et al. ........... | 710/263 |
| 6,351,471 B1 | 2/2002 | Robinett et al. | |
| 6,359,911 B1 | 3/2002 | Movshovich et al. | |
| 6,369,855 B1 * | 4/2002 | Chauvel et al. ........ | 348/423.1 |

(Continued)

OTHER PUBLICATIONS

International Telecommunication Union, "Information Technology—Generic Coding of Moving Pictures and Associated Audio Information: Systems", Jul. 1995, pp. v-120.

(Continued)

*Primary Examiner*—Chi H. Pham
*Assistant Examiner*—Kevin Mew
(74) *Attorney, Agent, or Firm*—McAndrews, Held & Malloy, Ltd.

(57) ABSTRACT

A system and method for packet processing are disclosed. The method may include performing using at least one processor, generating a DVB transport stream packet from a DSS transport stream packet. The generation may include mapping a prefix portion of a DSS transport stream packet into a header portion of the DVB transport stream packet comprising an inserted adaptation field. The inserted adaptation field may increase a size of the header portion of the DVB transport stream packet, and may decrease a size of a payload portion of the of the DVB transport stream. The generation may also include mapping a payload portion of the DSS transport stream packet into the payload portion of the DVB transport stream packet comprising the decreased size. The adaptation field may be at least fifty six (56) bytes in size.

16 Claims, 7 Drawing Sheets

U.S. PATENT DOCUMENTS

| | | |
|---|---|---|
| 6,438,145 B1 | 8/2002 | Movshovich et al. |
| 6,529,550 B2 | 3/2003 | Tahara et al. |
| 6,567,409 B1 | 5/2003 | Tozaki et al. |
| 6,744,789 B1 | 6/2004 | Michener |
| 6,785,336 B1 | 8/2004 | Kovacevic et al. |
| 7,035,335 B1 | 4/2006 | Iacobelli et al. |
| 7,113,546 B1 | 9/2006 | Kovacevic et al. |
| 7,370,342 B2 | 5/2008 | Ismail et al. |
| 7,675,876 B2 * | 3/2010 | Foster et al. ............... 370/307 |
| 2001/0043621 A1 * | 11/2001 | Anderson et al. ........... 370/516 |
| 2002/0003816 A1 | 1/2002 | Nabesako et al. |
| 2002/0054608 A1 | 5/2002 | Wan et al. |
| 2002/0146130 A1 | 10/2002 | Dellow |
| 2003/0086017 A1 | 5/2003 | Bogot |
| 2003/0169783 A1 | 9/2003 | Coffin, III et al. |

OTHER PUBLICATIONS

European Telecommunications Standards Institute and European Broadcasting Union, "Digital broadcasting systems for television, sound and data services: Specification for Service Information (SI) in Digital Video Broadcasting (DVB) systems", Jan. 1996, pp. 1-83.

* cited by examiner

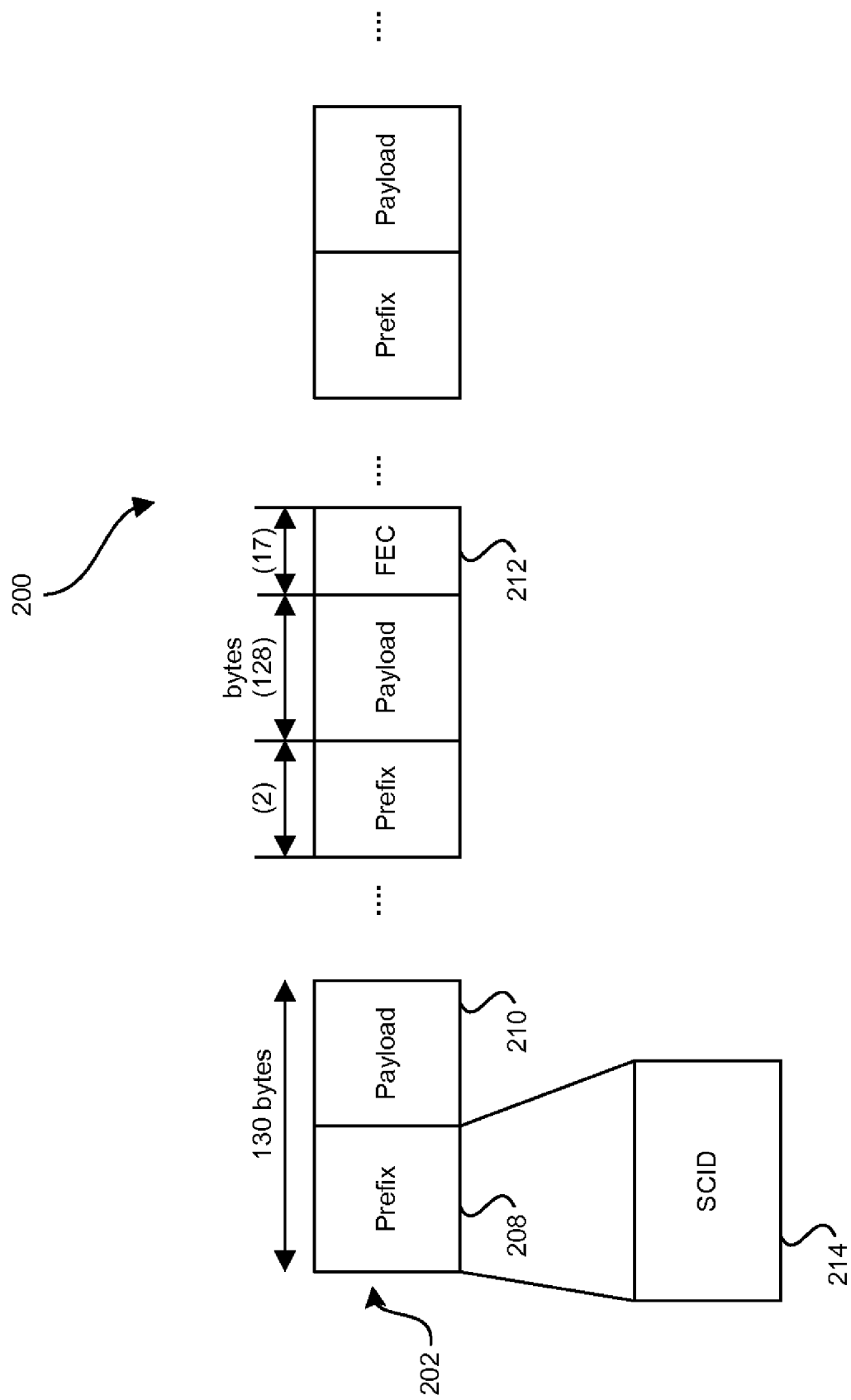

METHOD AND SYSTEM FOR GENERATING DIGITAL VIDEO BROADCAST (DVB) TRANSPORT STREAM FROM DIRECT SATELLITE SYSTEM (DSS) TRANSPORT STREAM

RELATED APPLICATIONS

This application is a continuation of U.S. application Ser. No. 10/341,704 filed Jan. 13, 2003.

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Embodiments of the present application relate generally to broadband packet transport and distribution, and more particularly to a method and system for generating a digital video broadcast (DVB) transport stream from a direct satellite system (DSS) transport stream.

The introduction of broadband networks, access devices such as set-top boxes, and media such as DVD disks recorded with digitally compressed audio, video and data signals, for example, which utilize motion Picture Expert Group (MPEG) compression protocols, may provide sound and picture quality that is virtually indistinguishable from the original material. The latest MPEG protocol called MPEG-2, provides the necessary protocols and infrastructure that may be used for transferring digitally compressed audio, video and data signals over various media. A detailed description of the MPEG-2 standard is published as ISO/IEC Standard 13818-2. As broadband networks continue to evolve, there is a need to provide access for legacy devices to ensure interoperability with legacy and disparate systems.

Satellite based systems have been utilized for decades to provide point-to-multipoint communications. Satellite based systems generally include an earth station which transmits microwave signals to an orbiting satellite. The orbiting satellite may be adapted to receive the microwave signals from the earth station, amplify the received microwave signals and transmit resulting amplified signals back towards earth or other orbiting satellites. In this regard, the satellite is adapted to function as a repeater and/or signal regenerator. Although satellites have been around for decades, the lack of standardized communication technologies, compounded with factors such as signal latency, high cost and immunity to atmospheric interference have resulted in low market penetration. Notwithstanding, advancements and standardization in satellite based communication technologies have created new opportunities that will result in greater market penetration. For example, advancements in open standards such as digital video broadcast (DVB) satellite standards and DVB data standard for Internet protocol (IP) have created opportunities for the efficient communication of streaming media to remote sites located throughout the globe.

The existence of proprietary and standardized satellite communication technologies provides a need for concurrent support of proprietary systems, legacy systems and/or systems that utilize the standardized communication technologies. For example, DirecTV which broadcasts digital television (DTV) programs utilizes a proprietary direct satellite system (DSS) transport stream, which has a packet format of 130 bytes per packet, including prefix and payload bytes. Today's standardized set-top boxes are designed to support DVB standard MPEG transport streams and do not provide support for the 130 bytes per packet DSS proprietary transport stream.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

Aspects of the present invention provide a method and system for converting a DSS transport stream to a DVB transport stream. The method may include encapsulating at least a prefix portion and a payload portion of a DSS transport stream packet into at least a header portion and a payload portion of a DVB transport stream packet. At least a portion of the prefix portion and the payload portion of the DSS transport stream packet may be mapped into at least a portion of the header portion and the payload portion of the DVB transport stream packet. At least a portion of the payload of the DSS transport stream packet may be aligned with at least a portion of the payload portion of the DVB transport stream packet.

The encapsulating step may further include the step of creating an adaptation field within at least a portion of the header portion of the DVB transport stream packet. The adaptation field may be at least fifty six (56) bytes in size. The mapping step may further include mapping at least an SCID of the DSS transport stream packet into a PID of the DVB transport stream packet. The mapping step may further include mapping at least an RTS of the DSS transport stream packet into a PCR of the DVB transport stream packet. The mapping step may further include the step of mapping at least a PTS and DTS resolution of the DSS transport stream packet into a corresponding PTS and DTS resolution of the DVB transport stream packet.

The aligning step may further include the step of locating PES headers in the DSS transport stream packet and validating the located PES headers to ensure that the headers are synchronous with transport headers of the DSS transport stream packet. The method for converting a DSS transport stream to a DVB transport stream may further include the step of inserting at least one null packet in at least one of the header portion and the payload portion of the DVB transport stream packet to maintain a specified data rate.

In another embodiment of the invention, a machine-readable storage, having stored thereon a computer program having at least one code section for converting a DSS transport stream to a DVB transport stream, the at least one code section executable by a machine for causing the machine to perform the steps described above.

Another embodiment of the invention provides a system for converting a DSS transport stream to a DVB transport stream. The system may include at least one encapsulator adapted to encapsulate at least a prefix portion and a payload portion of a DSS transport stream packet into at least a header portion and a payload portion of a DVB transport stream packet. At least one mapper may be adapted to map at least a portion of the prefix portion and the payload portion of the DSS transport stream packet into at least a portion of the header portion and the payload portion of the DVB transport stream packet. At least one aligner may be adapted to align at least a portion of the payload of the DSS transport stream packet with at least a portion of the payload portion of the DVB transport stream packet.

The at least one encapsulator may be further adapted to create an adaptation field within at least a portion of the header portion of the DVB transport stream packet. In accordance with an aspect of the invention, the adaptation field may be at least fifty six (56) bytes in size. The at least one mapper may be further adapted to map at least an SCID of the DSS transport stream packet into a PID of the DVB transport stream packet. The at least one mapper may be further adapted to map at least an RTS of the DSS transport stream packet into a PCR of the DVB transport stream packet. The at least one mapper may be further adapted to map at least a PTS and DTS resolution of the DSS transport stream packet into a corresponding PTS and DTS resolution of the DVB transport stream packet. The at least one aligner may further include a locator adapted to locate PES headers in the DSS transport stream packet and a validator adapted to validate the located PES headers to ensure that the headers are synchronous with transport headers of the DSS transport stream packet. Finally, a null packet generator may be provided to insert at least one null packet in the header portion and/or the payload portion of the DVB transport stream packet to maintain a specified data rate.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is block diagram illustrating an exemplary DSS transport stream packet.

DETAILED DESCRIPTION OF THE INVENTION

Figure 1:
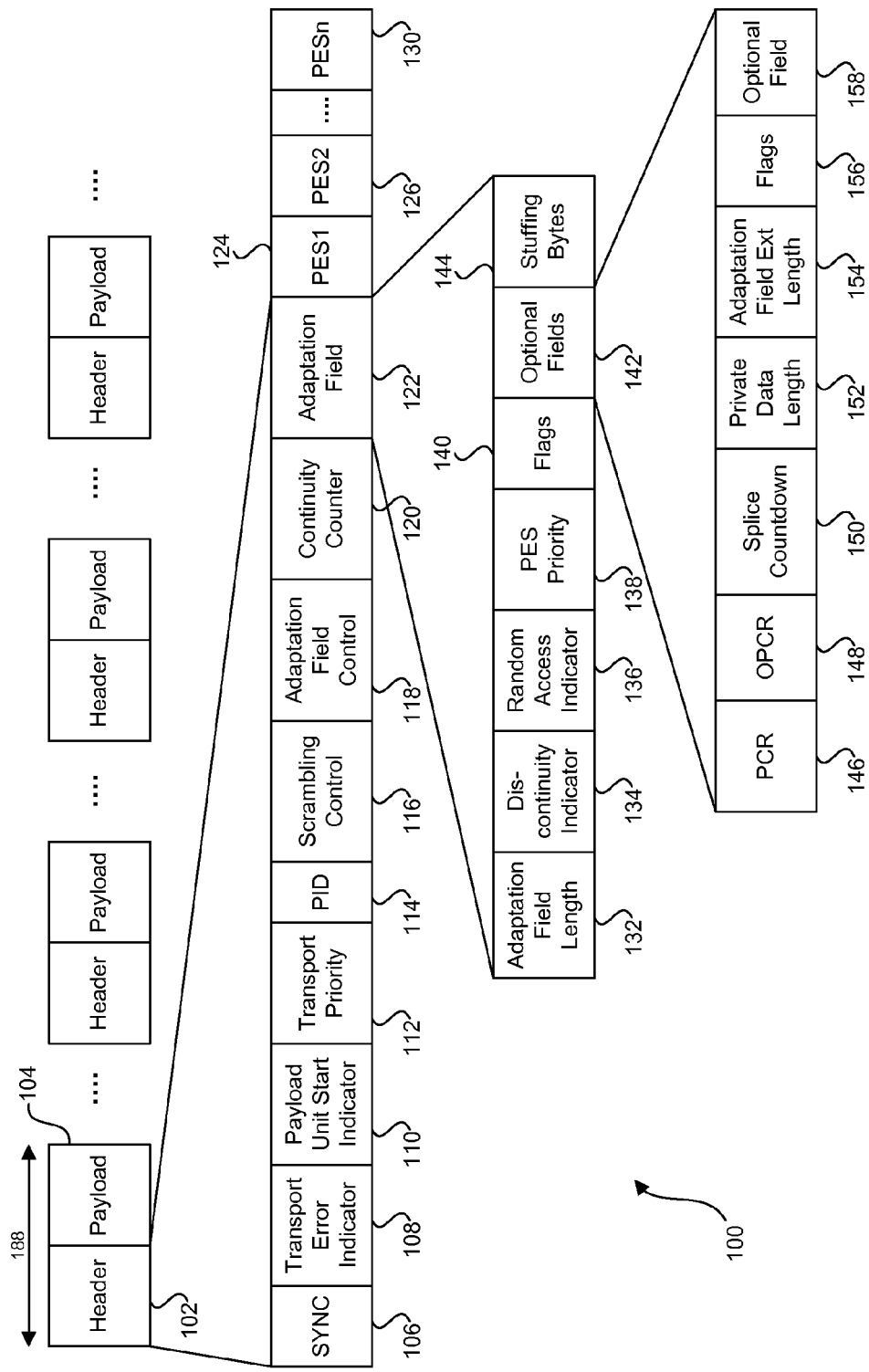
FIG. 1 is a diagram of the structure for an exemplary MPEG transport stream.

Aspects of the method and system for converting a DSS transport stream to a DVB transport stream include encapsulating at least a prefix portion and a payload portion of a DSS transport packet into at least a header portion and a payload portion of a DVB transport packet. At least a portion of the prefix portion and the payload portion of the DSS transport packet may be mapped into at least a portion of the header portion and the payload portion of the DVB transport packet. At least a portion of the payload of the DSS transport packet may be aligned with at least a portion of the payload portion of the DVB transport packet.

Given the current mixture of standardized, proprietary and legacy technologies, conversion methodologies are required to provide device compatibility and interoperability. In some applications, for example, an access device such as a set-top box may require the conversion of DSS proprietary transport streams to standardized DVB transport streams in order to communicate with a standardized external MPEG devices, such as a personal video recorders (PVRs) or a high definition televisions (HDTVs). In order to provide compatibility and interoperability between proprietary and legacy systems, and standardized DVB MPEG compliant systems, it may be necessary for conversion of the transport stream to meet one or more of the following requirements. Any resulting transport stream should be fully MPEG-2 DVB compliant, since a set-top box may lack a priori knowledge pertaining to a type of external MPEG decoding device that will receive and decode the converted transport stream. Consequently, the set-top box should not assume any information pertaining to the external MPEG decoding device. Moreover, conversion of the transport stream should be performed only in transport level without modifying any video elementary stream and audio elementary stream. Additionally, conversion of the transport stream should require minimal processing power with supporting time-base correction and appropriate data parsing and re-mapping to ensure interoperability.

An MPEG program may contain a plurality of data streams. These may include the elementary stream (ES), a packetized elementary stream (PES), a transport stream (TS) and a program specific information stream. An MPEG encoder typically creates the ESs by utilizing one or more analog video and audio content. The MPEG encoder may be configured to apply MPEG compression algorithms to the source content, which may result in an individual compressed ES for each audio and video stream. This encoded and compressed data stream may be decoded in a set-top box and viewed on a TV. Factors such as a bit rate of the encoded stream, quality of the original source content and encoder algorithm may typically determine the quality of the output signal. Notably, the type of encoding may determine whether another system will be able to decode and interpret a received MPEG data stream. In this regard, the other system may be a legacy or disparate system.

In a typical MPEG data stream, the length of individual ESs may be equivalent to the length of the program. Each ES may contain a plurality of variable-length packets called a PES. The PES may include a header that may precede one or more payload bytes. The header may include information pertaining to the encoding process required by the MPEG decoder to decompress and decode a received ES. Each individual ES may have a corresponding PES and any encoded audio and video information may still reside in separate PESs. Notably, the PES may be viewed primarily as a logical construct and is not intended to be utilized for data interchange, transport, and interoperability. Notwithstanding, the PES may be utilized for conversion between transport streams (TSs) and program information streams (PSs).

The TS and PS may be formed by multiplexing a plurality of PES packets. The TS may include a plurality of additional packets that may contain tables, which may be utilized for de-multiplexing the TS. The tables may be collectively called program specific information (PSI). To maintain synchronization and timing, null packets may also be inserted to fill the intervals between information-bearing packets. These null packets may contain dummy payload data and timing information for their associated program. The timing information may be called the program clock reference (PCR). The PCR may be located in one of the optional header fields of the TS packet. During operation, the PCR may permit the decoder to synchronize its clock to the same frequency as that of the original encoder's clock frequency. TS packets may have a fixed length of 188 bytes, which may include a header having a minimum size of 4 bytes and a maximum payload of 184 bytes.

FIG. 1 is a diagram of the structure for an exemplary MPEG transport stream 100. Referring to FIG. 1, TS 100 may include a header 102 and payload 104. Header 102 may include the following fields: synchronization (SYNC) 106, transport error indicator 108, payload unit start indicator 110, transport priority 112, packet ID (PID) 114, transport scrambling control 116, adaptation field control 118, continuity counter 120, adaptation field 122, and a plurality of PES, namely PES1 124, PES2 126, ..., PESn 130. The adaptation field 118 may further include the following fields: adaptation field length 132, discontinuity indicator 134, random access indicator 136, PES priority 138, flags 140, optional fields 142 and stuffing bytes 144. The optional fields 142 may further include the following: program clock reference (PCR) 146, OPCR 148, a splice countdown 150, private data length 152, adaptation field extension length 154, flags 156 and optional field 158.

The TS 100 may include variable length PES that may be divided into fixed length packets for use by a transmission system. In this regard, the information added by the TS is additional to the information contained in the headers of the PESs. SYNC byte 106 may be used to delineate the beginning and ending of TS packet 100. The transport error indicator 108 may indicate when there is an error in a packet or block. This may be particularly useful for error block testing. PID 114 may be a unique identifier that may identify every video and audio stream. Additionally, each PSI table may have a unique PID 114. The PID 114 may be utilized for identifying a channel and may include any information required for locating, identifying and reconstructing programs. Some PIDs are reserved for specific uses by the MPEG protocol. PID values may be stored in PSI tables. In order to ensure that all the audio, video and data for a program are properly decoded, it may be critical to ensure that the PIDs are correctly assigned and that the PSI tables correspond with their associated audio and video streams.

PCR 146 may have 42 bits, 9 bits of which may be incremented at 27 MHz and 33 bits that may be incremented at 90 kHz upon rollover of the 9 bits. The bits in PCR 146 may provide program clock recovery information that may be utilized for synchronization. PCR 146 may be used to provide a clock recovery mechanism for MPEG programs. A 27 MHz system time clock (STC) signal may typically be used for encoding MPEG signals. Decoding of the signal requires a clock that may be locked to the encoder's STC of 27 MHz. Notably, the PCR 146 may be utilized by the decoder to regenerate a local clock signal that is locked to the STC. Whenever a program is placed in the transport stream, a 27 MHz time stamp may be inserted into the PCR 146. When the signal is received by a decoder, the decoder may compare the value in the PCR 146 with the frequency of its local voltage controlled oscillator (VCO) and adjust the VCO to ensure that the VCO is locked to the frequency specified by the PCR 146. To ensure accuracy, the PCR 146 may be updated with the STC every about 100 ms.

The continuity counter (CC) 120 may be used to determine when packets are lost or repeated. It may include a 4-bit field, which may be repeatedly incremented from zero to 15 for each PID. Discontinuity counter 134 may permit a decoder to handle discontinuities in the transport stream. Discontinuity counter 134 may indicate a time base such as the PCR 146 and continuity counter 120 discontinuities. Random access indicator 136 may be configured to indicate whether the next PES packet in the PID stream contains a video-sequence header or the first byte of an audio frame. Splice countdown 150 may be configured to indicate the number packets of the same PID number to a splice point occurring at the start of PES packets.

Two or more MPEG TSs may be multiplexed to form a multi-program TS. In a case where the TC may include a single MPEG TS, the output of the multiplexer may be called a single program TS (SPTS). Furthermore, a number of SPTSs may be multiplexed to create a multi-program TS. In some cases, the program may include one or more ESs that may have a similar time reference. This may occur, for example, in a movie that has video and its corresponding audio content.

PSI may include a set of tables that may be part of a TS. The tables in the PSI may be required while de-multiplexing the TS and for matching PIDs to their corresponding programs. Once the PIDs are matched to their corresponding programs, the TS may be decoded by assembling and decompressing program contents. Typically, in order to determine which audio and video PIDs contain the corresponding content for a particular program, a program map table (PMT) may be decoded. Each program may have its own PMT bearing a unique PID value. The PAT may be decoded in order to determine which PID contains the desired program's PMT. The PAT may function as the master PSI table with PID value always equal to. In a case where the PAT cannot be found and decoded in the TS, no programs may be available for presentation.

The PSI table may be refreshed periodically at a rate that is fast enough to allow a set-top box to go through program recovery and decompression processes. This may be necessary to ensure real-time user interaction. The PSI may also be used to determine the accuracy and consistency of PSI contents. Notwithstanding, during programs changes or modification of multiplexer provisioning, there may be packets which have a PID value present in the TS, but have no corresponding reference in the PSI. Additionally, the PSI may have references to one or more packets in the PID that are not present in the TS.

In existing MPEG compliant systems, audio/video services may be carried using some or all of the 188 bytes of the packet, called transport packets. Multiple services may be differentiated using a packet identifier (PID) contained in a packet header called the transport packet header. Transport packets from various services may be multiplexed and transmitted on the same physical medium. Exemplary media may include, copper, coaxial cable, wireless, optical and any combination thereof. On the receiver side transport packets may be de-multiplexed and data may be separated for each service. For example, audio packets may be separately de-multiplexed from video packets.

Transport packets may include three fields, namely a 4-byte header, an optional adaptation field and a packet payload. The packet payload may not be altered by multiplexing or transmitting equipment, except during processing which may include data encryption and decryption. In generally, encryption may be done once within a typical MPEG processing system. Notwithstanding, some fields of adaptation field may be changed by multiplexing and transmission equipment. Typically, packet order within a PID channel may be maintained from an MPEG encoder to an MPEG receiver but packet order among multiple PID streams may not be guaranteed during transmission by any transmitting equipment. In cases where co-relation of packets from different PIDs may be required, packet position in a stream cannot be utilized since packet order among multiple PID channels may be altered.

Figure 1A:
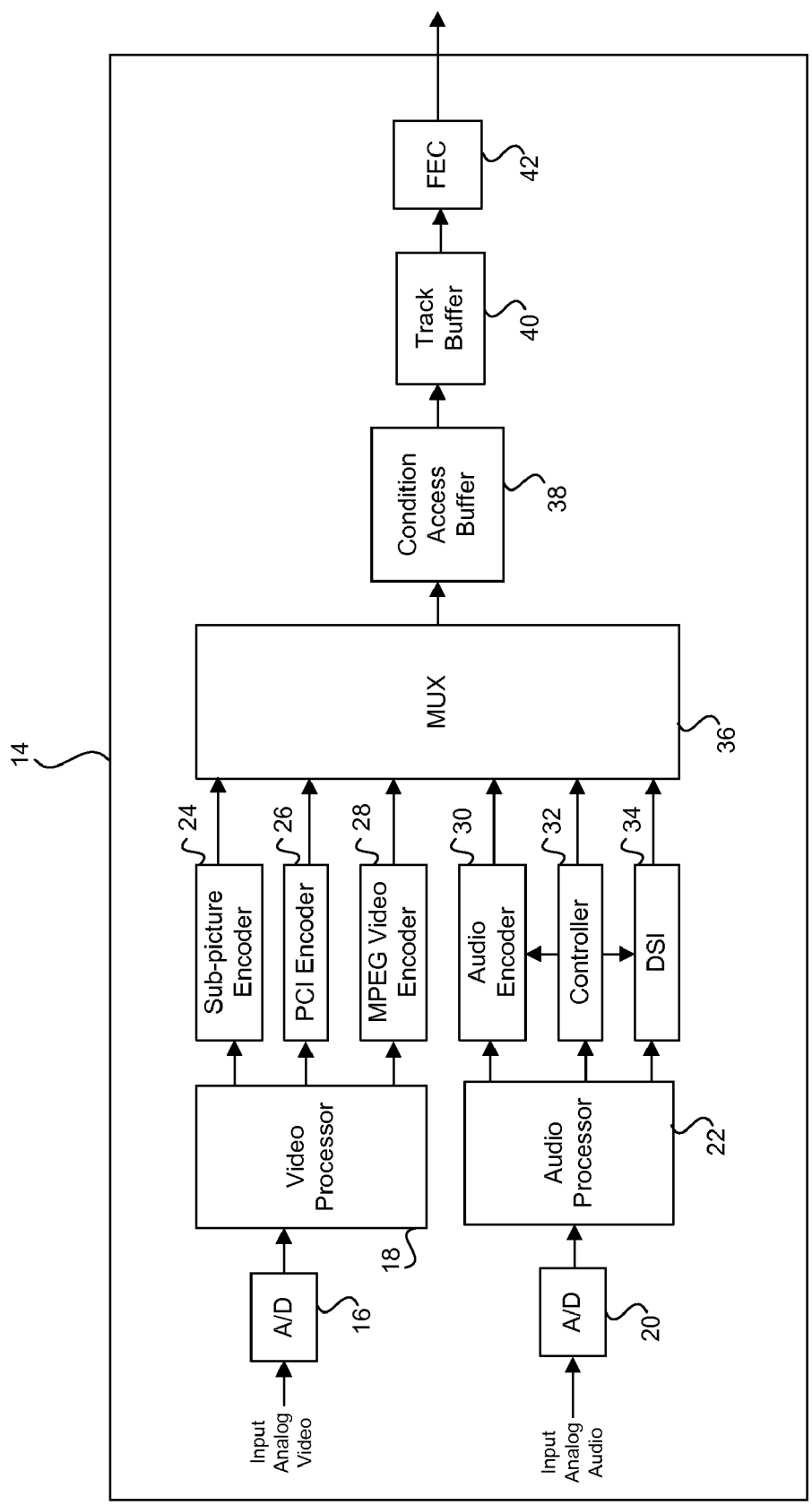
FIG. 1A is a block diagram of an exemplary MPEG encoding system.

FIG. 1A is a block diagram of an exemplary MPEG encoding system 14. Referring to FIG. 1A, an analog input signal may be converted to digital format by A/D converter 16. An output signal from the A/D converter 16 may be communicated to video processor 18 for processing. After the video processor 18 processes the signal, the output signal generated from the video processor 18 may be sent to a sub-picture encoder 24 for processing. A presentation control information (PCI) encoder 26 may be configured to encode PCI data for the video signal processed by video processor 22. The output signal generated from the video processor 18 may also be received and processed by an MPEG video encoder 28 which may be configured to format the video signal in MPEG format.

An analog input audio signal may be converted to digital format by A/D converter 20. An output signal from the A/D converter 20 may be communicated to audio processor 22 for processing. After the audio processor 22 processes the signal, the output signal generated from the audio processor 22 may be sent to an audio encoder 30 to be encoded in a suitable format. A data search information (DSI) encoder 34 may be configured to encode indexing and search data for the video signal processed by video processor 22. The outputs from the sub-picture encoder 24, PCI encoder 26, MPEG video encoder 28, audio encoder 30 and DSI encoder 34 may be multiplexed into a single data stream, by multiplexer 36. A controller 32 may be configured to control the operations of audio encoder 32, DSI encoder 34 and multiplexer (MUX) 36. The output of the MUX 36 may include a single steam, which may contain various kinds of PES. The PES may include, audio, video, PCI, DSI and sub-picture information.

The MPEG encoding system 14 may also include a conditional access buffer 38 that may be configured to controls propagation of the packets through MUX 36. A track buffer 40 may be used to buffer and assemble data packets for further processing. Finally, the assembled packets may be encoded with a forward error correction algorithm within the forward error correction block (FEC) 42 for transmission over a channel. The output of the FEC block 42 may be an MPEG formatted digital audio/video signal.

Figure 1B:
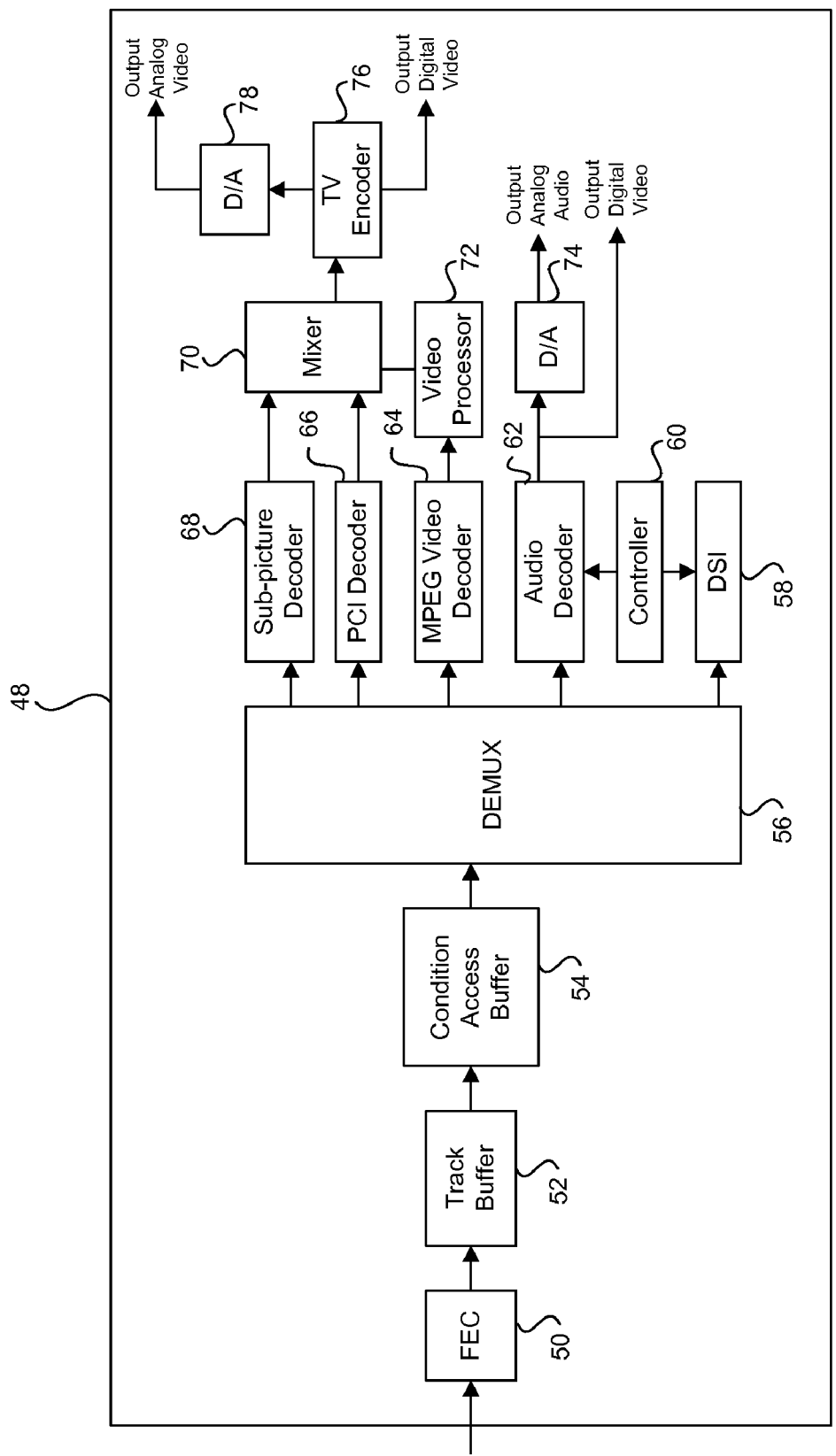
FIG. 1B is a block diagram of an exemplary MPEG decoding system.

FIG. 1B is a block diagram of an exemplary MPEG decoding system 48. MPEG decoding system 48 may be, for example, a set-top box. Referring to FIG. 1B, MPEG decoding system 48 may include a forward error correction processing block 50 and a track buffer 52. The track buffer 52 may be used to buffer and assemble data packets for further processing. The packets may be processed by a conditional access circuit 54 that may be configured to control propagation of the packets through de-multiplexer (DEMUX) 56 and into respective video and audio processing paths. The output of the DEMUX 56 may include various kinds of packetized elementary streams (PES), including audio, video, presentation control information (PCI), sub-picture information, and data search information (DSI) streams. The de-multiplexed PCI in the PES may be buffered prior to being decoded by PCI decoder 66.

The sub-picture information in the PES may be buffered and decoded by sub-picture decoder 68. The de-multiplexed video stream in the PES may be decoded by MPEG video decoder 64. Video processor 72 may be configured to process the output from the MPEG video decoder 64. Video processor 72 may be a microprocessor or an integrated circuit (IC). Subsequent to processing of the MPEG video, mixer 70 may combine the outputs of the PCI decoder 66, the video processor 64 and the sub-picture decoder 68 to form a composite video signal. The output of mixer 70 may thereafter be encoded in a conventional television signal format such as PAL, SECAM, or NTSC by the TV encoder 76. The output of the TV encoder 76 may be a digital video signal. However, D/A converter 78 may convert this digital video output signal to an analog video output signal.

The audio portion of the PES may be buffered and decoded by audio decoder 62. The output of the audio decoder 62 may be a digital audio signal. The audio D/A 74 may process digital audio received from the audio decoder 62 and produce an analog audio output signal. Audio decoder 62 may include a frame buffer sufficient for temporarily storing audio frames prior to decoding. Controller 60 may control the operation of audio decoder 62 and DSI 58. Controller 60 may be configured to utilize DMA to access to data in track buffer 52 or any other associated memory (not shown).

FIG. 2 is block diagram 200 illustrating an exemplary DSS transport stream packet 202. Referring to FIG. 2, there is shown a DSS transport stream packet 202. The DSS transport stream packet 202 may include a prefix portion 208 and a payload portion 210. The prefix portion 208 of the DSS transport stream packet 202 may contain two (2) bytes, while the payload portion 210 may contain 128 bytes. The DSS transport stream packet 202 may have 130 bytes per packet. An additional seventeen bytes following the end of the payload portion may be utilized for forward error correction (FEC) 212. The two (2) byte prefix may include a 12-bit service channel identification (SCID) 214, which may be adapted to define one of channels 0 through 4095 to which a packet may belong. The SCID 214 may be analogous to the PID 114 (FIG. 1) of an MPEG frame. Following the SCID 214, various flag fields may define a type of encryption utilized by the packet. Each flag may be four (4) bits.

Figure 3:
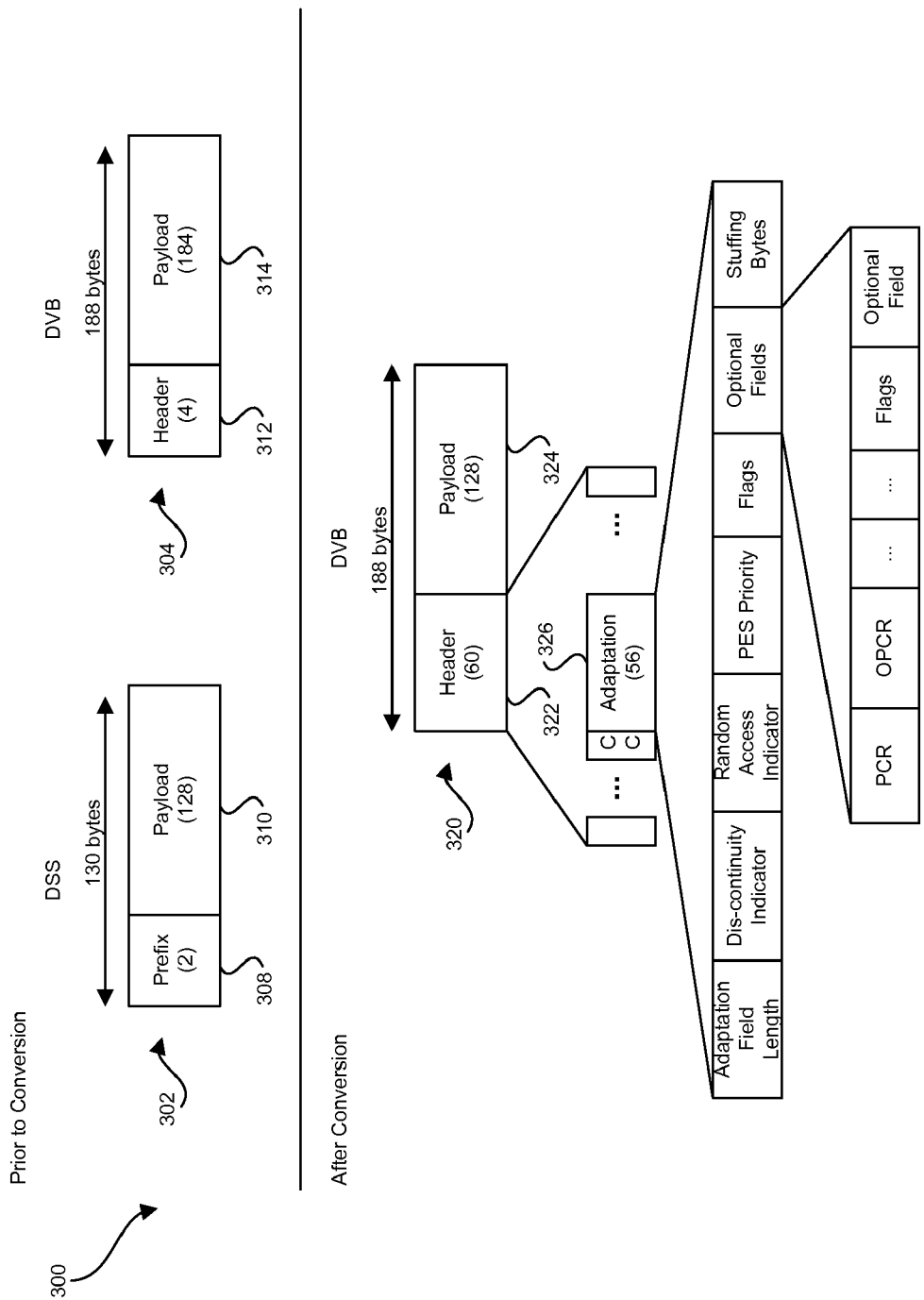
FIG. 3 is block diagram illustrating the conversion of a DSS transport stream packet to a DVB transport stream packet in accordance with an embodiment of the present invention.

FIG. 3 is block diagram 300 illustrating the conversion of a DSS transport stream packet to a DVB transport stream packet in accordance with an embodiment of the present invention. Referring to FIG. 3, there is shown a DSS transport stream packet 302 and DVB transport stream packet 304 prior to start of the conversion process. DVB transport stream packet 306 is the resultant MPEG-2 compliant packet after the conversion process.

The DSS transport stream packet 302 may include a prefix portion 308 and a payload portion 310. The prefix portion 308 of the DSS transport stream packet 302 may contain two (2) bytes, while the payload portion 310 may contain 128 bytes. The DSS transport stream packet 302 may have 130 bytes per packet. The DVB transport stream packet 304 may include a header portion 312 and a payload portion 314. The header portion 312 of the DVB transport stream packet 304 may contain at least four (4) bytes, while the payload portion 310 may contain a maximum of 184 bytes. The size of the header of the DVB transport stream packet 304 may be dependent on an associated adaptation field length 132 (FIG. 1). The DVB transport stream packet 304 may have 188 bytes per packet.

In accordance with an embodiment of the invention, an adaptation field 326 consisting of the difference between the payload 310 of the DSS transport stream packet 302 and the payload 314 of the DVB transport stream packet 304 may be created within the header 322 of the DVB transport stream packet 320. In this case, the adaptation field 326 may contain (184-128) bytes or 56 bytes. Since the header field originally had an initial size of at least four (4) bytes, the addition of the 56 bytes of the adaptation field results in a header size of at least 60 bytes. Other information such as the PCR and/or stuffing bytes may be added to the adaptation filed 326 of the header 322, thereby increasing its size accordingly. The 128 bytes of the DSS transport stream packet payload 314 may be mapped into the 128 bytes of the DVB transport stream packet payload 324.

Since the DSS transport stream packet 302 contains a 12-bit SCID and the DVB transport stream packet 304 contains a 13-bit PID, an appropriate mapping scheme may be utilized to map the 12-bit SCID into the 13-bit PID. Additionally, since some of the SCIDs utilized by the DSS may have specific reserved values, it may not be syntactically correct to utilize some of these SCIDs in the PID field of a DVB transport stream packet. In accordance with an embodiment of the invention, whenever a SCID lies between 0x02 and 0x0F, an offset value of 0x30 may be added to the SCID and the result placed in the PID field of the converted DVB transport stream packet. For example, video SCID 0x0a will have a resultant video PID of 0x3a, and audio SCID 0x0b will have a resultant audio PID of 0x3b. The offset value may be chosen based on the TS stream so that there is no conflict PID within such TS.

Other parameters in the header 222 may also require modification. For example, each DVB transport stream packet may have an associated 4-bit continuity counter (CC), and various transport header flags such as the payload unit start indicator may be initialized to appropriate values.

Regarding DSS transport stream packets, a relative time tagged sequence (RTS) may be found in auxiliary transport stream data packets. The RTS in a DSS transport stream packet may be analogous to the PCR in a DVB transport stream packet. Consequently, the RTS values utilizes remapping and insertion. The RTS values utilized by the DSS transport stream is a 40-bit value which may represent time defined by a 27 MHz resolution. The DVB PCR utilized by the DVB transport stream may be located in the adaptation field and is a 33 bit value which may represent time defined by a 90 KHz resolution. In accordance with the invention, an additional 7-bit extension may be utilized to represent time as defined by a 27 MHz resolution. The adaptation field extension length may be utilized to indicate the 7-bit extension.

Although a DSS transport steam does not require PES headers to be aligned with transport headers, DVB requires PES headers to be aligned with the transport header boundaries. In accordance with an aspect of the invention, during conversion of a DSS transport stream packet to a DVB transport stream packet, it may be necessary to search for PES headers and validate each PES header found. This will ensure that the PES header is synchronous with the transport headers in the resulting DVB packet.

DSS audio transport stream packets may be formatted in any of several ways. Notwithstanding, audio transport streams may, in certain instances, not require a PES layer. In that case, an ES may be placed directly in a DSS transport stream. Accordingly, additionally processing may be required while converting a DSS audio transport stream packet into a DVB audio transport stream packet. For example, more advanced audio parsing may be utilized to create ES DVB audio transport stream packets.

In order to provide proper timing and lip synchronization while transcoding a DSS transport stream to a DVB transport stream, it may not be necessary to rewrite PTS/DTS for audio and video data. In accordance with an aspect of the invention, upon initial acquisition of a PCR value, subsequent PCR values may be determined based on a defined transport stream bit rate. In this regard, any lip synchronization inherent in the original audio/video transport stream may be maintained in the resultant converted DVB transport stream. In one aspect of the invention, PCR may have an initial default value of zero (0). Upon reading one audio PTS or video PTS, PCR may be set to a value offset by 0.2 s from the first read-in PTS. In this regard, initial_PCR=(First_Read_In_PTS −0.2) seconds (s). For example, if the First_Read_In_PTS=1.5 s, then initial_PCR=(1.5-0.2)=1.3 s. Calculations may be based on a 27 MHz clock tick and PCR may be adapted to have a 42-bit resolution.

The PCR may be updated based on a user specified TR output bit rate. PCR may be updated after the output of a single video packet or audio packet. In a DVB transport stream, PCR packets interval should be less than 0.1 s. However in a DSS transport stream, PCR packet intervals may be larger than 0.1 s. Accordingly, a current PCR value may be compared against a previous packet's PCR, and in a case where the difference is greater than about 0.08 s for example, an additional PCR packet may be output to the TS stream.

Figure 4:
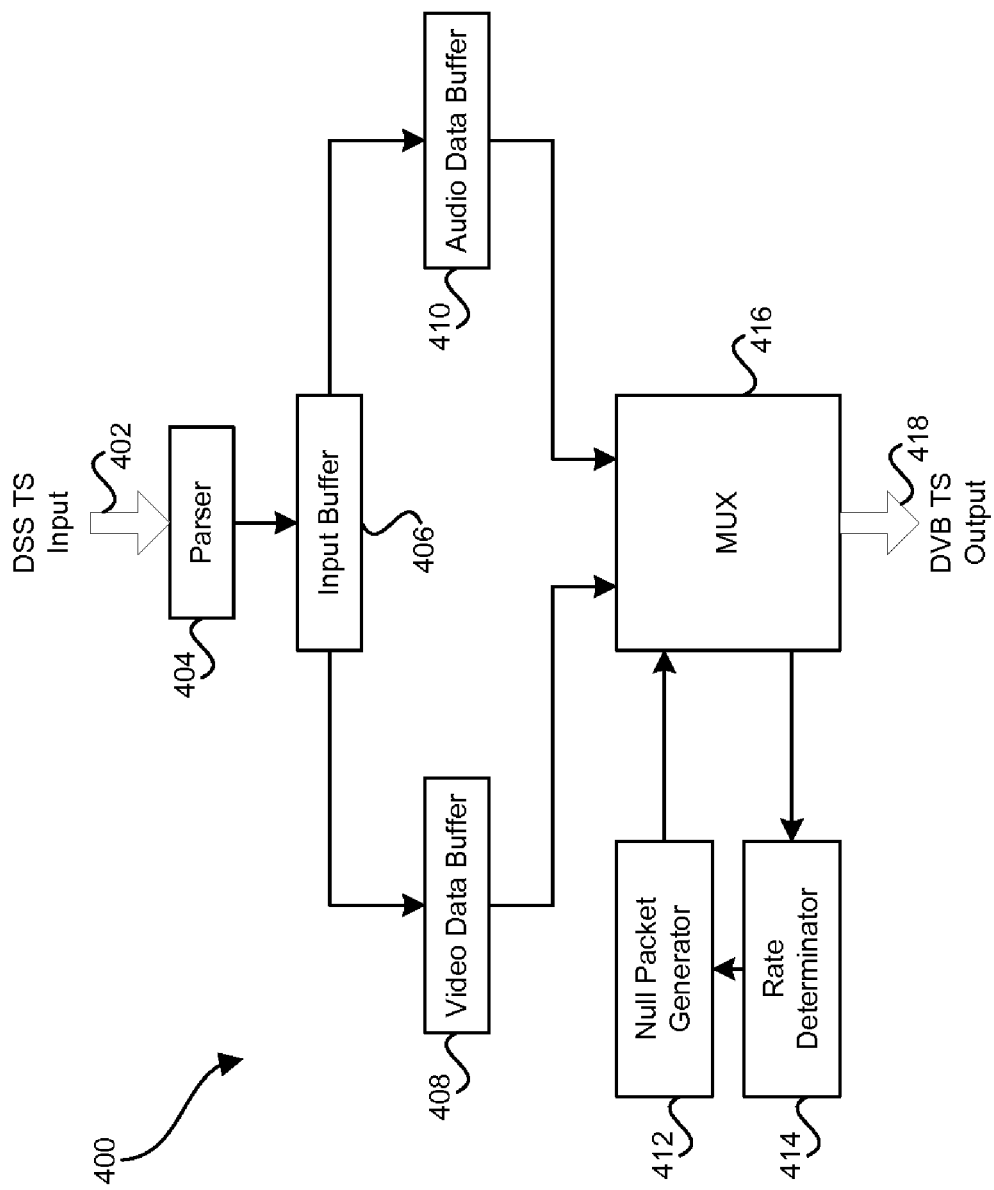
FIG. 4. is a block diagram of an exemplary system for converting a DSS transport stream to a DVB transport stream in accordance with an embodiment of the invention.

FIG. 4. is a block diagram 400 of an exemplary system for converting a DSS transport stream to a DVB transport stream in accordance with an embodiment of the invention. Referring to FIG. 4, there is shown a parser block 404, an input buffer block 406, a video data buffer block 408, an audio data buffer block 410, a null packet generator 412, a rate determinator 414, and a multiplexer (MUX) 416. DSS transport stream 402 serves as an input to the parser block 404 and the DVB transport stream 418 is a resultant converted output produced by the MUX 416.

The parser block 404 may include at least a processor function having at least suitable software for parsing packets in the input DSS transport stream. In this regard, the parser block 404 may be adapted to parse the SCID from packets in the input DSS transport stream 402. The SCID may correlate each packet in the input DSS transport stream 402 to a particular channel. The output of the parser block 404 may be coupled to an input of the buffer block 406.

The input buffer block 403, video data buffer block 408 and audio data buffer block 410 may include any suitable random access memory (RAM), which may include, but is not limited to, static RAM (SRAM), dynamic RAM (DRAM), dual data rate RAM (DDR) and video (VRAM). The input buffer block 403, video data buffer block 408 and audio data buffer block 410 may utilize suitable high speed memory and logic that may be adapted to minimize any effects of processing latency.

At least one output of the input buffer block 406 may be coupled to an input of the video data buffer block 408. The at least one output of the input buffer block 406 coupled to the input of the video data buffer block 408, may be adapted to facilitate transfer video packets from the input buffer block 406 to the video data buffer block 408. At least one output of the input buffer block 406 may be further coupled to an input of the audio data buffer block 410. The at least one output of the input buffer block 406 coupled to the input of the audio data buffer block 410, may be adapted to facilitate transfer audio packets from the input buffer block 406 to the audio data buffer block 410.

An output of each of the video data buffer 408 and audio data buffer 410 may be coupled to an input of the MUX 416. Rate determinator 414 and null packet generator 412 may also be coupled to the multiplexer 416. The multiplexer 416 may be adapted to multiplex processed audio and video packets and also null packets generated by the null packet generator 212. The rate determinator 414 may be adapted to determine whether an instantaneous bit rate corresponds with a specified bit rate of the converted DVB transport stream. In conjunction with the rate determinator 414, the null packet generator 412 may generate one or more null packets which may be multiplexed into the converted output DVB transport stream 418 in order to maintain a specified bit rate.

In operation, the input DSS transport stream 402 may be received by the parser block 404. The parser block 404 may parse the incoming DSS input transport stream 402 based on the SCID of the packets in the DSS input transport stream 202. Since the SCID correlates packets to a particular channel, packets for a particular channel may be sent to, for example, various channel processing queues maintained in the input buffer 406. Accordingly, based on whether a packet is a video packet or data packet, the packets may be buffered in video data buffer 408 and audio data buffer 410 respectively, for processing.

The video and audio packets may be multiplexed by multiplexer 416 to form the output DVB transport stream 418. In order to maintain a specified data rate, the rate determinator 414 may be adapted to determine the data rate of the processed packets. Accordingly, the null packet generator 412 may be adapted to generate a corresponding amount of null packets required to meet a specified bit rate. The generated null packets may be multiplexed with the converted DSS transport steam packets to create the DVB transport stream output 418.

The maximum video payload size of a single DSS transport stream packet is 127 bytes. For DSS SD, the video payload may be located in, for example, an MPEG-2 ES format. To convert or transcode this payload into an MPEG formatted payload, it may be necessary to remove any redundant data from the video payload of the transport stream packet. Accordingly, upon receipt of a transport stream packet containing video data, portions of the header information such as a picture header flag HD, may be saved in various header related variables. If a transport stream packet carries redundant video data, the picture header flag HD may be labeled and at least one additional NB flag may be located. The NB flag may be adapted to contain redundant data length. After discarding any redundant bytes of the video transport stream packet, any remaining raw video data may be moved to a video data buffer 208 from the input buffer 206, the latter of which may be used to search for redundant data.

Figure 5:
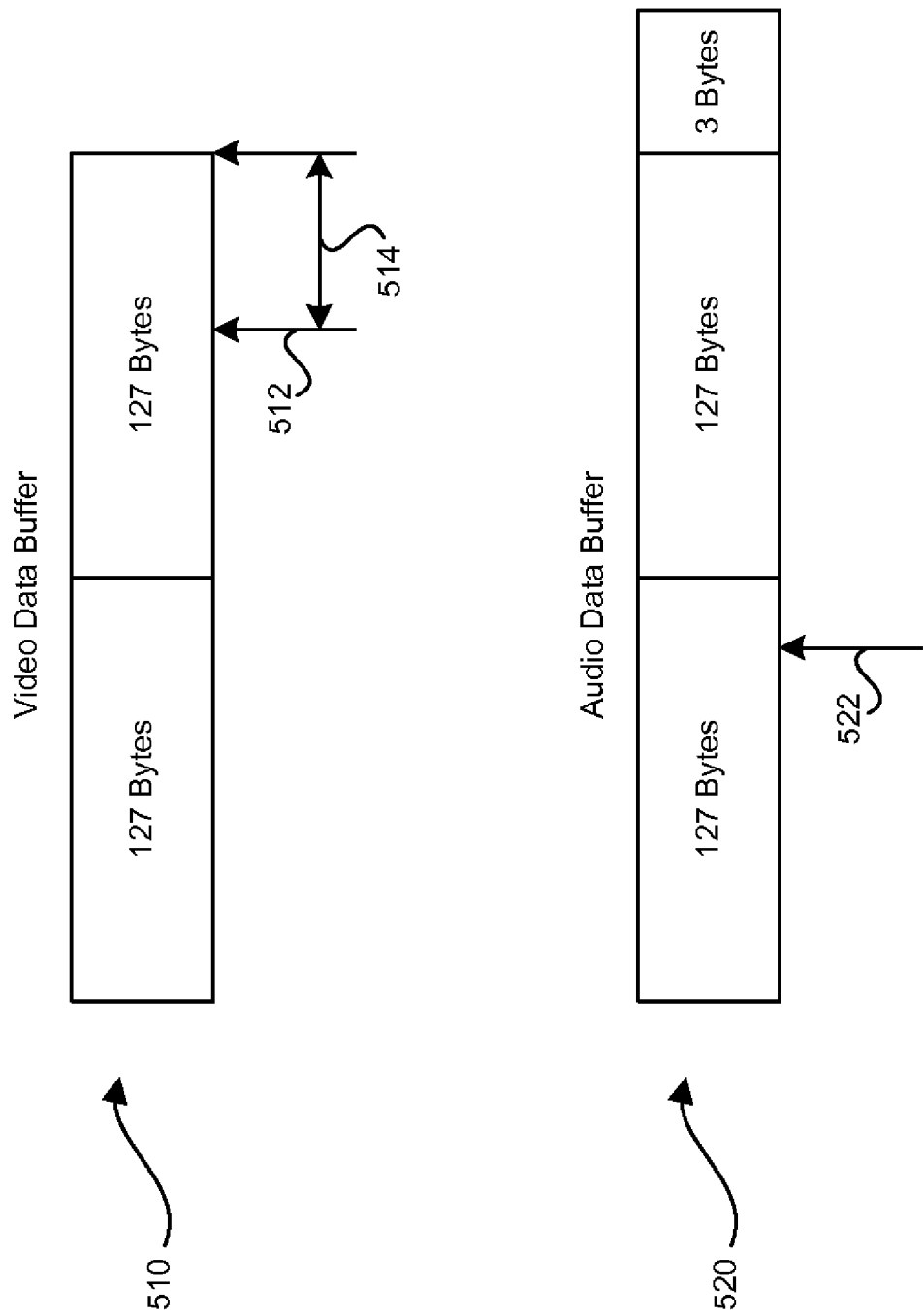
FIG. 5 is an block diagram of an exemplary video buffer 510 arrangement and an exemplary audio buffer 520 arrangement in accordance with an embodiment of the invention.

FIG. 5 is an block diagram of an exemplary video buffer 510 arrangement and an exemplary audio buffer 520 arrangement in accordance with an embodiment of the invention. Referring to FIG. 5, the video data buffer 510 may be representative of the video data buffer 408 (FIG. 4). For illustrative purposed, the video data buffer 510 may be, for example, 254 bytes in size so that it may sufficiently accommodate two raw video data packets, each being 127 bytes. However, the invention is not limited in this regard and other video buffer sizes may be employed without departing from the spirit of the invention. The audio data buffer 520 may be representative of the audio data buffer 408 (FIG. 4).

The audio data buffer 520 may be similar to video data buffer 510. However, the audio data buffer 520 may be adapted to include an additional three (3) bytes. Typically, DSS packetizes MPEG audio into MPEG-1 system packets, and AC3 audio into MPEG-2 PES packets. In order to facilitate the conversion of MPEG-1 packets to MPEG-2 PES packets, three (3) additional bytes may be required. Accordingly, the audio data buffer 520 may be 257 bytes in size.

Referring to the DSS video transport stream packets, PTS/DTS may be carried within picture user data. In the case of a picture header 0x0100, the video transport stream packet may be packet aligned and the picture header may be toggled by the header flag HD. Thus for each picture header packet, upon locating the user data header 0x1B2, the PTS/DTS may be extracted. In order to locate the user data header 0x1B2 with the greatest accuracy and statistical probability, packet headers may be searched across the packet header's upper boundary 512, to a packet boundary of a successive video transport stream packet. If a user data header packet is found, a position or location indicating a first byte of user data header 0x1B2 may be noted for future data manipulation. Reference 514 may represent the largest length of video user data given an upper bound of the search header 512.

Subsequent to searching the header to locate the user data header, the PTS/DTS video for the corresponding video transport stream packet may be read from video transport stream data packet. In the case of DSS, since the clock rate is 27 MHz, PTS/DTS has a 32-bit resolution. However, in the case of DVB, since the clock rate is 90 KHz, PTS/DTS has a 33-bit of resolution. Accordingly, any retiming function utilized may require checking of two loopback boundaries. The first loopback boundary may be utilized for DSS. In the case of DSS, if a counter utilized for the clock loops back from $2^{32}$ to zero (0), then it may be appropriate to ensure that resulting exemplary parameters such as mpegPTS/mpegDTS does not loop back, but incremented to its proper value. It should be recognized that after the mpegPTS parameter has been incremented, its values may be negative due to an MPEG video reorder process. Thus, in the case of a parameter dssPTS, loopback may occur from an upper boundary of $2^{32}$ to a lower boundary of zero (0) or vise versa. For parameter mpegDTS, the increment may always be positive. Consequently, in the case of parameter dssDTS, loopback may only happen from the upper boundary $2^{32}$ to the lower boundary of zero (0). In the case of MPEG, as an illustration, parameters or variables such as mpegPTS and/or mpegDTS may be saved as 27 MHz, thereby ensuring a loopback boundary of $2^{42}$ instead of $2^{33}$. In this case, the conversion from 27 MHz to 90 KHz may occur prior to the video PTS/DTS output.

Conversion of a video ES to a corresponding video PES may be achieved by inserting a PES header before each picture header 0x100. For video, a PES length may be set to zero (0), which is permitted by the MPEG specification. Before the PES, a value of 0xFF may be inserted in the stuffing byte of the adaptation field. Time stamps corresponding to the PTS/DTS value may be converted from 27 MHz to 90 KHz and subsequently placed in the transport stream. In transport stream header, a parameter such as a payload_unit_start_indicator may be set to a value of, for example one (1), for the packet containing the PES header. In the case of DSS, it may be permissible for both the PTS and DTS values to be similar, and in that case, both values corresponding to PTS and DTS may be transferred. However, in the case of MPEG, if a PTS value is equivalent to a DTS value, then only PTS itself will be transferred in the transport stream.

In the case of DSS, audio may be carried in MPEG-1 or MPEG-2 PES using a similar structure. Furthermore, no payload packet alignment may be required for audio. Thus, an audio header may cross the boundary of any two audio transport stream data packets. Therefore, it may be necessary to search the header of each audio packet and an upper boundary may be set to the last byte of the first audio data packet. This may guarantee that any cross packet headers may be found with a high statistical probability. In the case of DVB audio, the header is 0x1C0 and for AC3 audio, the header is 0x1BD.

Since the header values 0x1C0 and 0x1BD may be contained in an audio payload, not every value of 0x1C0 and 0x1BD found may represent and appropriate header. For example, not every 0x1C0 and 0x1BD within audio data packet are audio packet headers, since perchance, it may be actual payload data. Accordingly, each audio header found in an initial search may be rechecked to ensure its authenticity. In the case of MPEG audio, it may be appropriate to search for the first two payload bytes following the header once a value of 0x1C0 is found. If the first two payload bytes following the value 0x1C0 contains an MPEG audio start code 0xFFF, then the value of 0x1C0 may be a genuine audio header. Otherwise, it may not be a genuine header value and the search for an actual header value should continue.

In the case of AC3 audio, the search may be more involved since a PES header can be of any length. Accordingly, it might not be sufficient to search the first two bytes of the payload, since the header values may exist beyond the boundary of two data packets. From a practical perspective, the chances of this occurring may be statistically remote. Consequently, it may be appropriate to utilize a method similar to that used for searching for header 0x1C0 as previously described. In order to verify header 0x1BD, reserved flags following header 0x1BD may be compared to determine whether there may be consistent with MPEG-2 syntax.

DSS MPEG audio's PTS has resolution of 33 bits, which is the similar to that of MPEG. However, the clock rate for DSS is 27 MHz instead of 90 KHz. In general, audio PTS increment may be positive since there is no audio frame reordering. In the case of DSS, AC3 audio's PTS has a resolution of 32 bits. As a result, the processing may be similar to that of DSS MPEG audio.

Based on the MPEG standard, a PES header should be packet aligned within a transport stream packet payload whenever a parameter such as a payload_unit_start_indicator has been set. In one aspect of the invention, in the case of DSS, the payload may not be packet aligned. In this case, once an audio header 0x1C0 or 01xBD has been located in the first audio data packet, one transport stream packet containing the audio data may be generated before the audio header. In another aspect of the invention, in the case of MPEG audio, stuffing bytes, for example 0xFF, after audio header may be discarded and an additional PES packet flag byte need to be inserted. In an embodiment of the invention, 3 additional PES packet flag bytes may be inserted. However, the invention is not limited in this regard. In a case where additional PES packet flag bytes may be inserted, the PES packet length will change. Accordingly, in both MPEG and AC3 audio, the PES packet length may be adjusted since a PES length 0x00 may only be permitted in the case of video. Any remaining data may be repositioned within audio data buffer.

In certain instances, packet reordering may be utilized. Since each data buffer may be adapted to hold two data packets, the output order of audio and video packet might be changed. However, for audio or video alone, the data packet may maintain its original order and in this case, reordering may not be necessary. For example, if A denotes an audio packet and V denotes a video packet, given the following input transport stream data sequence:

VAVVAVVVVAVVVAVVVA, a corresponding output sequence, neglecting the insertion of null packets, may be:

VVVVVVAVVVAVVVAVAVA.

A null packet may be inserted whenever a transport stream output cannot meet a specified bit rate. For example, an algorithm based on a video picture header and video frame rate may be utilized to determine an instantaneous bit rate. For a specified transport stream, assuming a bit rate of, for example ts_rate, the total output bits between each picture is ts_rate/frame_rate (bit). In this case, the algorithm may be adapted to determine the picture header count and accordingly determine an appropriate number of bits which may be required to properly adjust the bit rate. If the instantaneous bit rate is less than the specified bit rate, then null packets may be inserted.

In light of the foregoing, the invention provides a method and system for converting a DSS transport stream to a DVB transport stream. In accordance the invention, the packet length of the 130-byte DSS frame may be extended or encapsulated into a 188-byte DVB frame. Additionally, various parameters such as the SCID and the RTS may have to be re-mapped into appropriate DVB parameters such as PID and PCR respectively.

Accordingly, the present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

Notwithstanding, the invention and its inventive arrangements disclosed herein may be embodied in other forms without departing from the spirit or essential attributes thereof. Accordingly, reference should be made to the following claims, rather than to the foregoing specification, as indicating the scope of the invention. In this regard, the description above is intended by way of example only and is not intended to limit the present invention in any way, except as set forth in the following claims.

The invention claimed is:

1. A method for packet processing, the method comprising:
performing using at least one processor, functions comprising:
generating a digital video broadcast (DVB) transport stream packet from a direct satellite system (DSS) transport stream packet, wherein said generation comprises:
mapping a prefix portion of a DSS transport stream packet into a header portion of said DVB transport stream packet comprising an inserted adaptation field;
aligning at least a portion of a payload of said DSS transport stream packet with at least a portion of said payload of said DVB transport stream packet, wherein said inserted adaptation field increases a size of said header portion of said DVB transport stream packet, and decreases a size of said payload portion of said of said DVB transport stream; and
mapping said payload portion of said DSS transport stream packet into said payload portion of said DVB transport stream packet comprising said decreased size.

2. The method according to claim 1, wherein said adaptation field is at least fifty six (56) bytes in size.

3. The method according to claim 1, comprising mapping at least an SCID of said DSS transport stream packet into a PID of said DVB transport stream packet.

4. The method according to claim 1, comprising mapping at least an RTS of said DSS transport stream packet into a program clock reference (PCR) of said DVB transport stream packet.

5. The method according to claim 1, comprising mapping at least a PTS and DTS resolution of said DSS transport stream packet into a corresponding PTS and DTS resolution of said DVB transport stream packet.

6. The method according to claim 1, comprising locating PES headers in said DSS transport stream packet.

7. The method according to claim 6, comprising validating said located PES headers to ensure that said headers are synchronous with transport headers of said DSS transport stream packet.

8. The method according to claim 1, comprising inserting at least one null packet in one or both of said header portion of said DVB transport stream packet and said payload portion of said DVB transport stream packet to maintain a specified data rate.

9. A system for packet processing, the system comprising:
at least one processor generates a DVB transport stream packet from a DSS transport stream packet, wherein during said generating, said at least one processor:
maps a prefix portion of a DSS transport stream packet into a header portion of said DVB transport stream packet comprising an inserted adaptation field;
aligns at least a portion of a payload of said DSS transport stream packet with at least a portion of said payload of said DVB transport stream packet, wherein said inserted adaptation field increases a size of said header portion of said DVB transport stream packet, and decreases a size of said payload portion of said of said DVB transport stream; and
maps said payload portion of said DSS transport stream packet into said payload portion of said DVB transport stream packet comprising said decreased size.

10. The system according to claim 9, wherein said adaptation field is at least fifty six (56) bytes in size.

11. The system according to claim 9, wherein said at least one processor maps at least an SCID of said DSS transport stream packet into a PID of said DVB transport stream packet.

12. The system according to claim 9, wherein said at least one processor maps at least an RTS of said DSS transport stream packet into a PCR of said DVB transport stream packet.

13. The system according to claim 9, wherein said at least one processor maps at least a PTS and DTS resolution of said DSS transport stream packet into a corresponding PTS and DTS resolution of said DVB transport stream packet.

14. The system according to claim 9, wherein said at least one processor locates PES headers in said DSS transport stream packet.

15. The system according to claim 14, wherein said at least one processor validates said located PES headers to ensure that said headers are synchronous with transport headers of said DSS transport stream packet.

16. The system according to claim 9, wherein said at least one processor inserts at least one null packet in one or both of said header portion of said DVB transport stream packet and said payload portion of said DVB transport stream packet to maintain a specified data rate.

* * * * *